United States Patent
Suciu et al.

(10) Patent No.: US 9,109,537 B2
(45) Date of Patent: Aug. 18, 2015

(54) TIP TURBINE SINGLE PLANE MOUNT

(75) Inventors: Gabriel L. Suciu, Glastonbury, CT (US); James W. Norris, Lebanon, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 2554 days.

(21) Appl. No.: 11/720,470

(22) PCT Filed: Dec. 4, 2004

(86) PCT No.: PCT/US2004/040077
§ 371 (c)(1),
(2), (4) Date: May 30, 2007

(87) PCT Pub. No.: WO2006/062497
PCT Pub. Date: Jun. 15, 2006

(65) Prior Publication Data
US 2008/0019830 A1    Jan. 24, 2008

(51) Int. Cl.
*F02C 7/20* (2006.01)
*F02K 3/068* (2006.01)
*B64D 27/26* (2006.01)
*F02C 3/073* (2006.01)

(52) U.S. Cl.
CPC ............. *F02K 3/068* (2013.01); *B64D 27/26* (2013.01); *F02C 3/073* (2013.01); *F02C 7/20* (2013.01)

(58) Field of Classification Search
CPC ............ F02K 3/068; F02C 3/073; F02C 7/20; B64D 27/26

USPC ............ 415/213.1, 214.1, 9, 173.4; 60/39.43, 60/797; 248/554–557, 612, 637; 244/53 R, 244/54, 55, 56
See application file for complete search history.

(56) References Cited

U.S. PATENT DOCUMENTS

| | | | |
|---|---|---|---|
| 1,544,318 A | 6/1925 | Hodgkinson | |
| 2,221,685 A | 11/1940 | Smith | |
| 2,414,410 A | 1/1947 | Griffith | |
| 2,499,831 A | 3/1950 | Palmatier | |
| 2,548,975 A | 4/1951 | Hawthorne | |
| 2,611,241 A | 9/1952 | Schulz | |
| 2,620,554 A | 12/1952 | Mochel et al. | |
| 2,698,711 A | 1/1955 | Newcomb | |
| 2,753,140 A * | 7/1956 | Hasbrouck et al. | 248/555 |
| 2,801,789 A | 8/1957 | Moss | |
| 2,830,754 A | 4/1958 | Stalker | |
| 2,874,926 A | 2/1959 | Gaubatz | |
| 2,936,978 A * | 5/1960 | Lauck | 248/555 |

(Continued)

FOREIGN PATENT DOCUMENTS

| DE | 1301364 | 8/1969 |
|---|---|---|
| FR | 2274788 | 1/1976 |

(Continued)

*Primary Examiner* — Christopher Verdier
(74) *Attorney, Agent, or Firm* — Carlson, Gaskey & Olds, P.C.

(57) ABSTRACT

A tip turbine engine assembly (8) includes a fan (32) rotatable in a fan plane (22) about an engine centerline (112). The fan (32) includes a fan blade (34) that defines a core airflow passage therethrough. An engine case (10) surrounds and supports the fan and engine. A plurality of engine mounts (20) for mounting the engine to an aircraft are positioned circumferentially about the outside of the engine case in a single mounting plane (22) that is perpendicular to the engine centerline.

23 Claims, 8 Drawing Sheets

(56) References Cited

U.S. PATENT DOCUMENTS

| | | |
|---|---|---|
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,078,342 A * | 1/1992 | Langley et al. .............. 244/54 |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,259,183 A * | 11/1993 | Debeneix .................... 60/797 |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Liston et al. |
| 6,364,805 B1 | 4/2002 | Stegherr |
| 6,371,721 B1 * | 4/2002 | Sathianathan et al. ............ 415/9 |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0141859 A1 * | 10/2002 | Sathianathan et al. ............ 415/9 |
| 2002/0190139 A1 | 12/2002 | Morrison |
| 2003/0031556 A1 | 2/2003 | Mulcaire et al. |
| 2003/0097844 A1 * | 5/2003 | Seda ............................. 60/791 |
| 2003/0131602 A1 | 7/2003 | Ingistov |
| 2003/0131607 A1 | 7/2003 | Daggett |
| 2003/0192303 A1 * | 10/2003 | Paul ............................. 60/262 |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| GB | 905136 | 9/1962 |
| GB | 1287223 | 8/1972 |
| GB | 1503394 | 3/1978 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059978 | 6/2006 |
| WO | 2006059988 | 6/2006 |
| WO | 2006059989 | 6/2006 |
| WO | 2006060006 | 6/2006 |
| WO | 2006062497 | 6/2006 |
| WO | 2006059971 | 8/2006 |
| WO | 2006059979 | 6/2007 |

* cited by examiner

TIP TURBINE SINGLE PLANE MOUNT

BACKGROUND OF THE INVENTION

The present invention relates to a tip turbine engine, and more particularly to mounting the tip turbine engine along a single mounting plane.

An aircraft gas turbine engine of the conventional turbofan type generally includes a forward bypass fan and a low pressure compressor, a middle core engine including a combustor, and an aft low pressure turbine all located along a common longitudinal axis. Although highly efficient, conventional turbofan engines operate in an axial flow relationship. The axial flow relationship results in a relatively complicated elongated engine structure and therefore requires multiple mounting planes along the elongated engine structure to support the engine and mount the engine on an aircraft. Utilizing multiple mounting planes may complicate the mounting process, add weight, and make assembly laborious and expensive.

A recent development in gas turbine engines is the more longitudinally compact tip turbine engine. Tip turbine engines locate an axial compressor forward of a bypass fan, which includes hollow fan blades that receive airflow from the axial compressor therethrough such that the hollow fan blades operate as a centrifugal compressor. Compressed core airflow from the hollow fan blades is mixed with fuel in an annular combustor located radially outward from the fan. The combustor ignites the fuel mixture to form a high energy gas stream which drives turbine blades that are integrated onto the tips of the hollow bypass fan blades for rotation therewith as disclosed in U.S. Patent Application Publication Nos.: 2003192303; 20030192304; and 20040025490. The tip turbine engine provides a thrust to weight ratio equivalent to conventional turbofan engines of the same class within a package of significantly shorter longitudinal length.

Accordingly and because of the unique architecture and shorter longitudinal length of the tip turbine engine, it is desirable to provide more efficient and simplified mounting assemblies for the tip turbine engine.

SUMMARY OF THE INVENTION

The tip turbine engine assembly according to the present invention provides an exhaust case portion with engine mounts for mounting the engine to an aircraft. The engine mounts are positioned substantially circumferentially about the exhaust case portion in a single mounting plane substantially perpendicular to the engine centerline. In one embodiment, the single mounting plane is located aft of a fan-turbine rotor assembly. In other examples, the engine mounts and single mounting plane are located coplanar with or forward of the fan-turbine rotor assembly.

In another tip turbine engine assembly example, three engine mounts are connected to brackets. The brackets provide a connection to struts that extend to an aircraft or other structural member to support and securely mount the engine on the aircraft.

In another tip turbine engine assembly example, the engine includes three first engine mounts positioned in a single mounting plane located aft of a fan plane. A second engine mount is positioned remote from the single mounting plane and forward of the fan plane. In other examples, the three first engine mounts or the second engine mount are located coplanar with the fan plane.

In another tip turbine engine assembly example, the engine includes three first engine mounts positioned in a first mounting plane. The first mounting plane is coplanar with a fan plane. Three second engine mounts are positioned in a second mounting plane located forward of the fan plane. In other examples, the first engine mounts or second engine mounts are located aft of the fan plane.

In another tip turbine engine assembly example the engine includes three first engine mounts positioned in a first mounting plane located aft of the fan plane. Three second engine mounts are positioned in a second mounting plane located aft of the fan plane.

The present invention therefore provides various engine mount configurations for mounting a longitudinally compact tip turbine engine to an aircraft.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
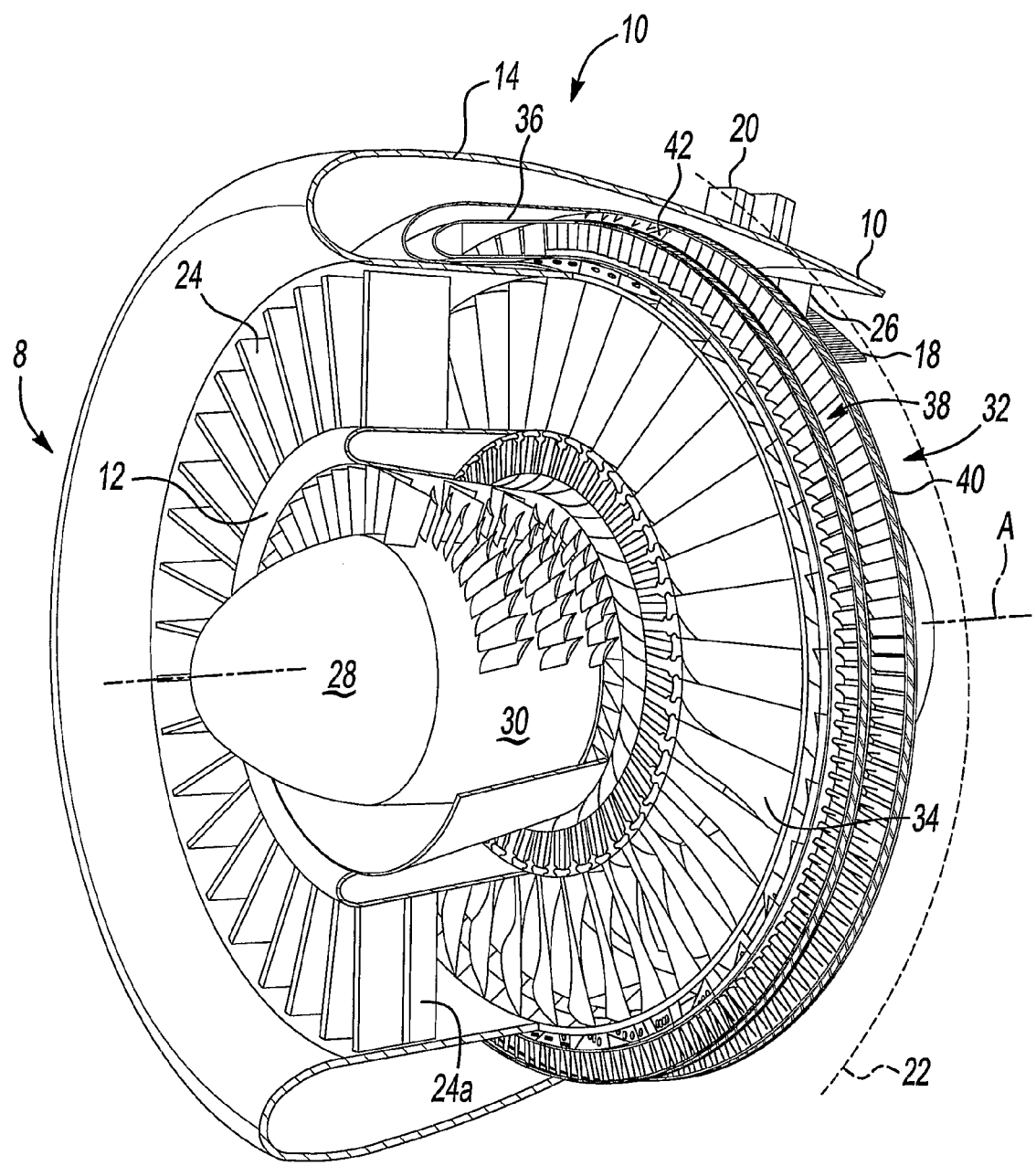
FIG. 1 is a partial sectional perspective view an exemplary tip turbine engine assembly of the present invention.

FIG. 1 illustrates a perspective partial sectional view of a tip turbine engine (TTE) type gas turbine engine 8. The engine 8 includes an outer case 10 and a rotationally fixed static inner support structure 12. The outer case 10 includes a forward case portion 14 and an exhaust case portion 16. The exhaust case portion 16 includes an exhaust mixer 18 and a plurality of engine mounts 20 that are located in a single mounting plane 22. The engine mounts 20 are adapted to connect to a bracket or other connector for mounting the engine 8 on an aircraft. A multiple of fan inlet guide vanes 24 are mounted between the outer case 10 and the static inner support structure 12. Each inlet guide vane 24 preferably includes a variable trailing edge 24A. A multiple of exit guide vanes 26 extend radially inward from the exhaust case portion 16.

A nosecone 28 is preferably located along the engine centerline A to improve airflow into an axial compressor 30. The axial compressor 30 is mounted about the engine centerline A behind the nosecone 28.

A fan-turbine rotor assembly 32 is mounted for rotation about the engine centerline A aft of the axial compressor 30. The fan-turbine rotor assembly 32 includes a multiple of hollow fan blades 34 to provide internal, centrifugal compression of the compressed airflow from the axial compressor 30 for distribution to an annular combustor 36 located within the outer case 10.

A turbine 38 includes a multiple of tip turbine blades 40 (two stages shown) which rotatably drive the hollow fan blades 34 relative a multiple of tip turbine stators 42 which extend radially inward from the outer case 10. The annular combustor 36 is axially forward of the turbine 38 and communicates with the turbine 38.

Figure 2A:
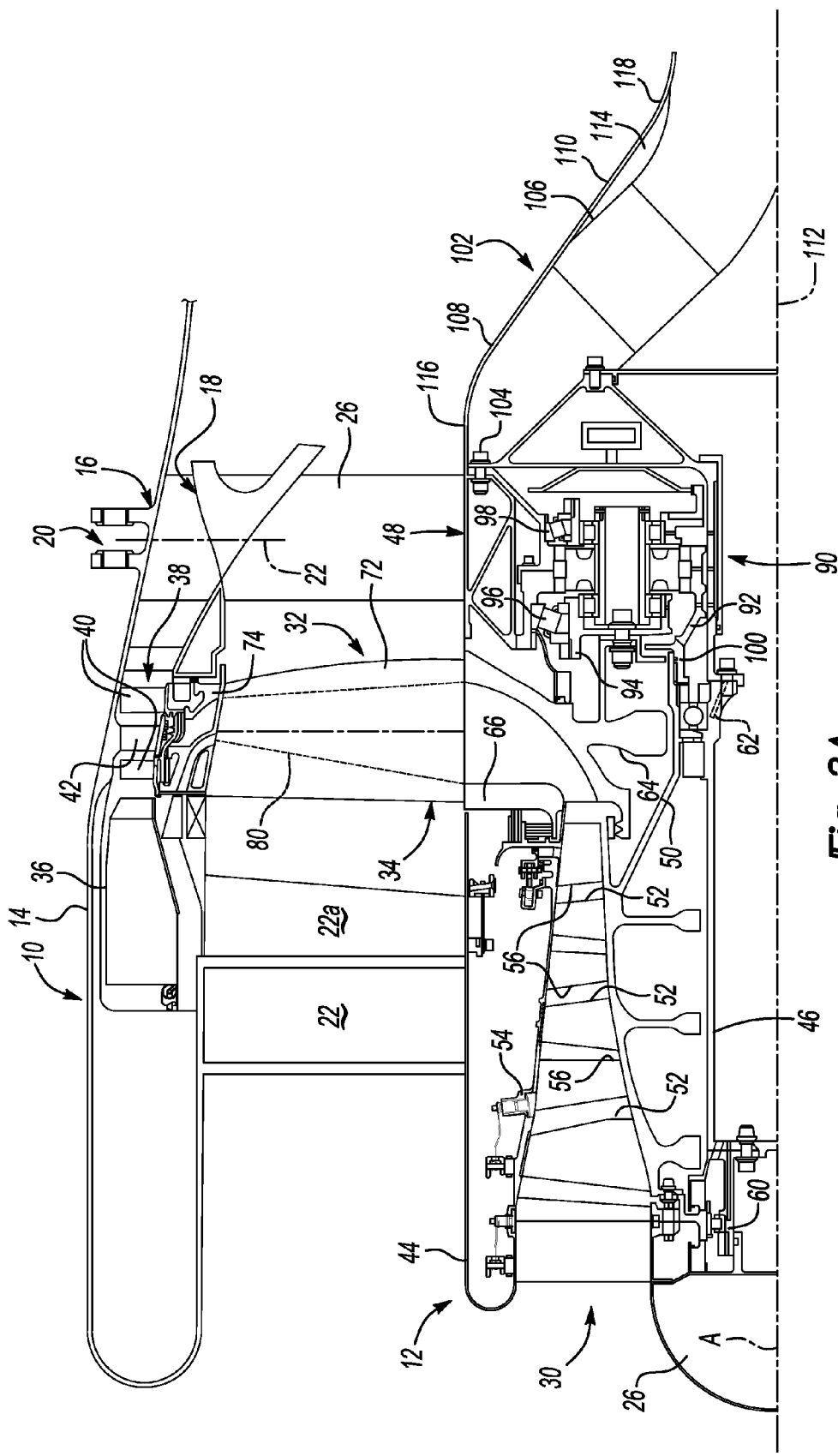
FIG. 2A is a cross-sectional view of the tip turbine engine of FIG. 1.
Figure 2B:
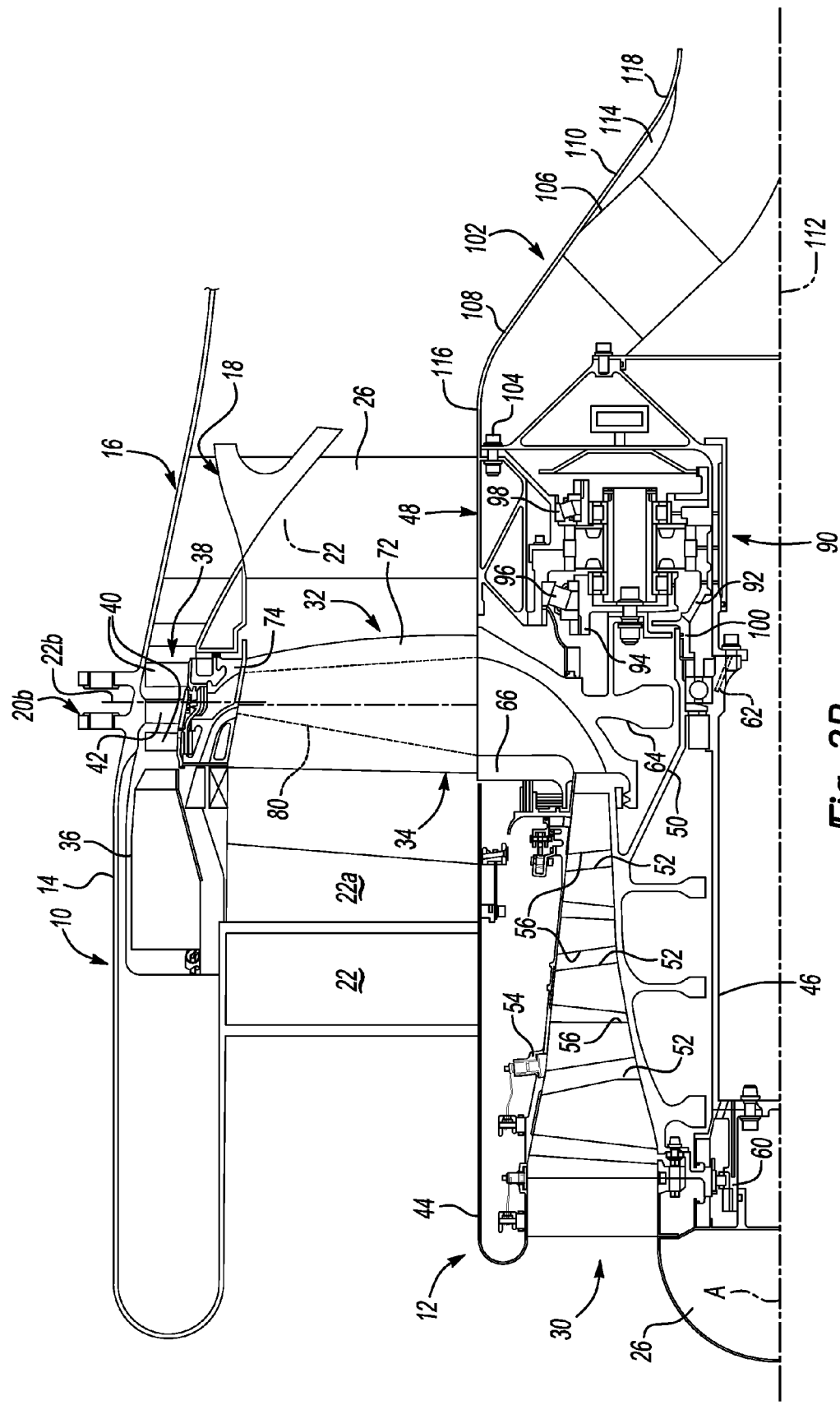
FIG. 2B is another cross-sectional view of the tip turbine engine of FIG. 1.

Referring to FIG. 2A-2B, the rotationally fixed static inner support structure 12 includes a splitter 44, a static inner support housing 46 and a static outer support housing 48 located coaxial to said engine centerline A.

The exhaust case portion 16 of the outer case 10 is structurally attached to the exit guide vanes 26, which are structurally attached to the static outer support housing 48 with a fastener, weld, or other method of securing. The static outer support housing 48 structurally supports the static inner support housing 46, which structurally supports the axial compressor 30. The engine mounts 20 extend radially outward from the outer case 10 for mounting the engine 8 to an aircraft. That is, the support structure relation between the exhaust case portion 16, the exit guide vanes 26, the static outer support housing 48, the static inner support housing 46, and the axial compressor 30 allows the outer case 10 to structurally support the engine 8 and thus allows the engine 8 to be mounted from the engine mounts 20 in the single mounting plane 22.

Preferably, the single mounting plane 22 is located aft of the fan-turbine rotor assembly 32, although the engine mounts 20 and single mounting plane 22 alternatively may be located coplanar with or forward of the fan-turbine rotor assembly 32, as illustrated in FIG. 2B by the engine mount 20B and single mounting plane 22B and engine mount 20C and single mounting plane 22C, respectively.

The axial compressor 30 includes the axial compressor rotor 50 from which a plurality of compressor blades 52 extend radially outwardly and a compressor case 54 fixedly mounted to the splitter 44. A plurality of compressor vanes 56 extend radially inwardly from the compressor case 54 between stages of the compressor blades 52. The compressor blades 52 and compressor vanes 56 are arranged circumferentially about the axial compressor rotor 50 in stages (three stages of compressor blades 52 and compressor vanes 56 are shown in this example). The axial compressor rotor 50 is mounted for rotation upon the static inner support housing 46 through a forward bearing assembly 60 and an aft bearing assembly 62.

The fan-turbine rotor assembly 32 includes a fan hub 64 that supports a multiple of the hollow fan blades 34. Each hollow fan blade 34 includes an inducer section 66, a hollow fan blade section 72 and a diffuser section 74. The inducer section 66 receives airflow from the axial compressor 30 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is turned and diffused toward an axial airflow direction toward the annular combustor 36. Preferably the airflow is diffused axially forward in the engine 8, however, the airflow may alternatively be communicated in another direction.

A gearbox assembly 90 aft of the fan-turbine rotor assembly 32 provides a speed increase between the fan-turbine rotor assembly 32 and the axial compressor 30. The gearbox assembly 90 is mounted for rotation between the static inner support housing 46 and the static outer support housing 48. The gearbox assembly 90 includes a sun gear shaft 92 which rotates with the axial compressor 30 and a planet carrier 94 which rotates with the fan-turbine rotor assembly 32 to provide a speed differential therebetween. The gearbox assembly 90 is preferably a planetary gearbox that provides co-rotating or counter-rotating rotational engagement between the fan-turbine rotor assembly 32 and an axial compressor rotor 50. The gearbox assembly 90 is mounted for rotation between the sun gear shaft 92 and the static outer support housing 48 through forward bearings 96 and a rear bearing 98. The forward bearings 96 and the rear bearing 98 are both tapered roller bearings and both handle radial loads. The forward bearing 96 handles the aft axial load, while the rear bearing 98 handles the forward axial loads. The sun gear, shaft 92 is rotationally engaged with the axial compressor rotor 50 at a splined interconnection 100 or the like. Alternatively, the gearbox assembly 90 could provide a speed decrease between the fan turbine rotor assembly 32 and the axial compressor rotor 50.

Figure 2C:
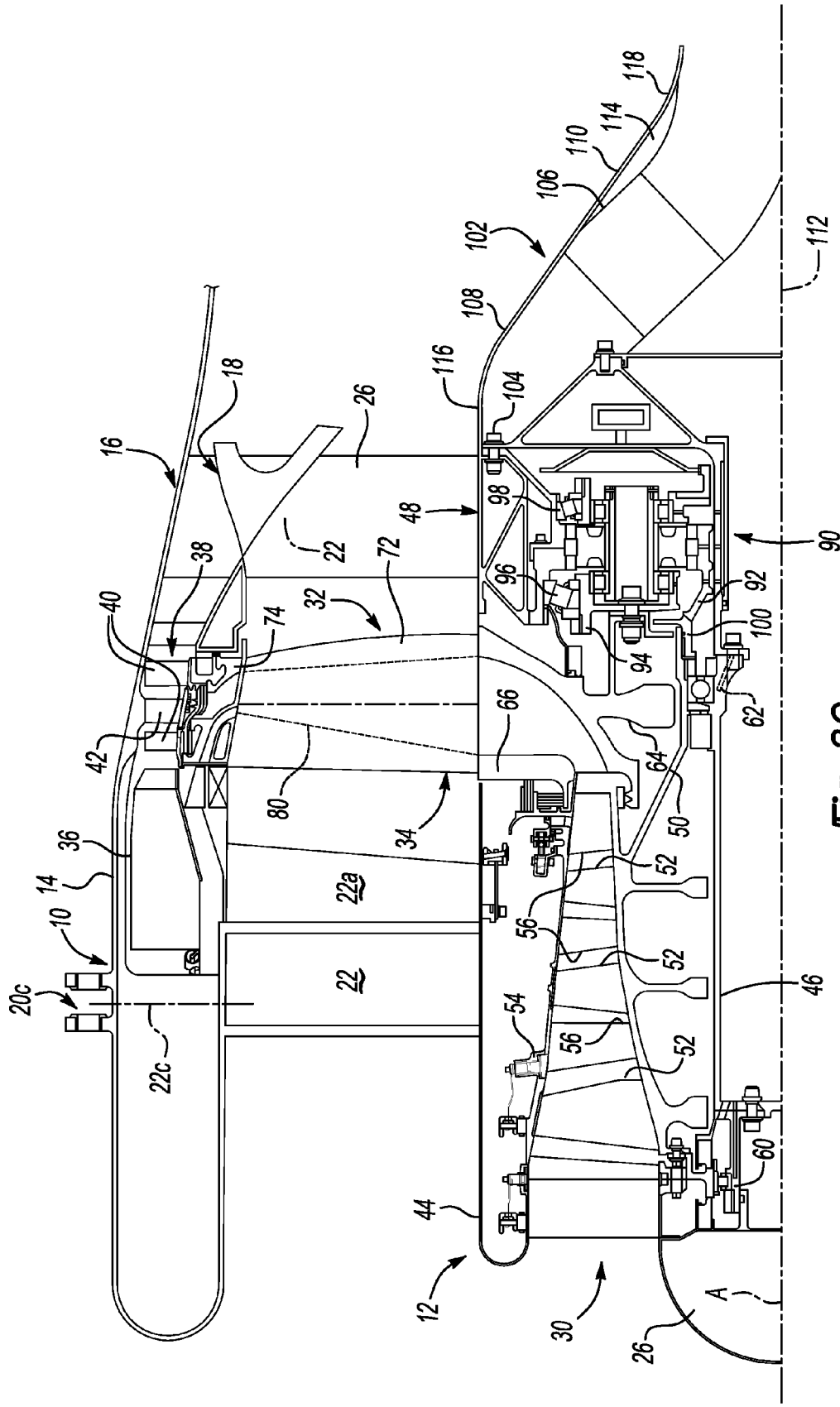
FIG. 2C is another cross-sectional view of the tip turbine engine of FIG. 1.

A tailcone assembly 102 is mounted on the static outer support housing 48 with a set of fasteners 104, although only one fastener is illustrated in FIG. 2. The tailcone assembly 102 houses a device 106, such as an oil cooler or other device, and includes a frustoconical surface 108. A wall structure 110 disposed about central axis 112 forms the frustoconical surface 108. The wall structure 110 defines an interior compartment 114 and a forward portion 116 that tapers to an aft portion 118 of the tailcone assembly 102.

In operation, air enters the axial compressor 30, where it is compressed by the three stages of the compressor blades 52 and compressor vanes 56. The compressed air from the axial compressor 30 enters the inducer section 66 in a direction generally parallel to the engine centerline A and is turned by the inducer section 66 radially outwardly through the core airflow passage 80 of the hollow fan blades 34. The airflow is further compressed centrifugally in the hollow fan blades 34 by rotation of the hollow fan blades 34. From the core airflow passage 80, the airflow is turned and diffused axially forward in the engine 8 into the annular combustor 36. The compressed core airflow from the hollow fan blades 34 is mixed with fuel in the annular combustor 36 and ignited to form a high-energy gas stream. The high-energy gas stream is expanded over the multiple of tip turbine blades 40 mounted about the outer periphery of the fan-turbine rotor assembly 32 to drive the fan-turbine rotor assembly 32, which in turn drives the axial compressor 30 through the gearbox assembly 90.

Concurrent therewith, the fan-turbine rotor assembly 32 discharges fan bypass air axially aft and the exhaust mixer 18 merges the bypass air with the high energy gas stream in the exhaust case portion 16. The exit guide vanes 26 located between the static outer support housing 48 and the outer case 10 guide the combined airflow out of the engine 8 to provide forward thrust.

Figure 3:
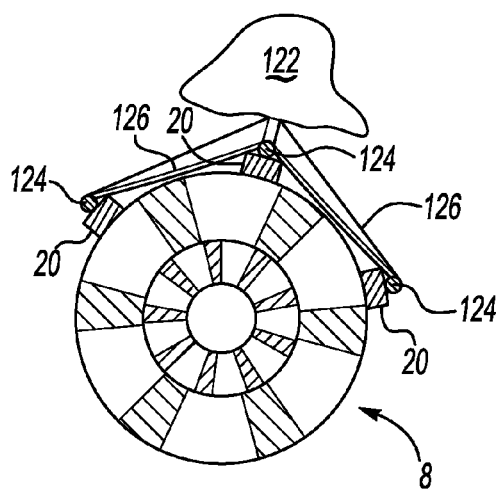
FIG. 3 is a longitudinal view of the tip turbine engine assembly of FIG. 2 showing three engine mounts.

FIG. 3 shows a longitudinal view of the engine 8 of FIG. 2 mounted to an aircraft 122. The engine mounts 20 are located circumferentially about the engine 8. In one example, three engine mounts 20 are connected to brackets 124, although additional engine mounts 20 may be utilized. The brackets 124 provide a connection to struts 126. The struts 126 extend to the aircraft 122 or other structural member to support the engine 8 and securely mount the engine 8 on the aircraft 122.

Figure 4:
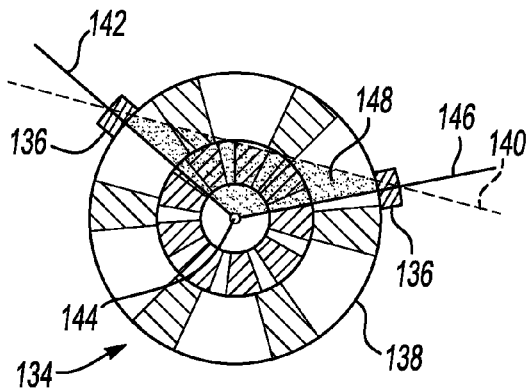
FIG. 4 is a longitudinal view of another embodiment of the tip turbine assembly having two engine mounts.

FIG. 4 shows a longitudinal view of another embodiment of the tip turbine engine assembly of the present invention. The engine 134 includes two engine mounts 136 located on an outer case 138 of the engine 134. Since two engine mounts alone cannot define a single plane, the line 140 extending between the two engine mounts 136, the line 142 extending from one engine mount 136 through the engine centerline 144, and the line 146 extending from the other engine mount 136 through the engine centerline 144 define a single mounting plane 148 that is substantially perpendicular to the engine centerline 144.

FIGS. 5A-5D shows a perspective view of another tip turbine engine assembly embodiment of the present invention. The engine 156 includes three first engine mounts 158 on the outer case 160 and positioned in a single mounting plane 162 which is substantially perpendicular to the engine centerline A. The single mounting plane 162 is located aft of a fan plane 164 formed by the rotation of the fan-turbine rotor assembly 32 (FIG. 2). A second engine mount 166 is positioned remote from the single mounting plane 162 and forward of the fan plane 164. The three first engine mounts 158 or the second engine mount 166 may alternatively be located coplanar with the fan plane 164, as illustrated by the engine mounts 158B drawn in FIG. 5B. The second engine mount 166 alternatively may be located aft of the fan plane 164, as illustrated by the second engine mount 166B drawn in FIG. 5C. The first three engine mounts 158 alternatively may also be located forward of the fan plane 164, as illustrated by the engine mounts 158C drawn in FIG. 5D.

Figure 6A:
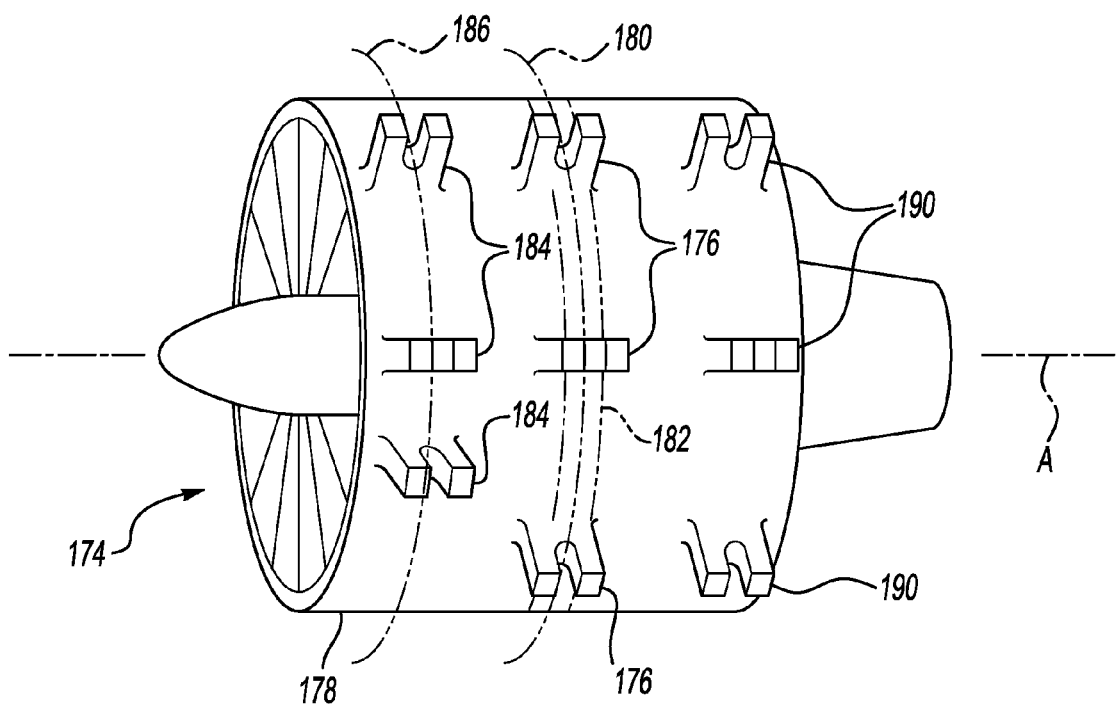
FIG. 6A is a perspective view of another embodiment of a tip turbine engine assembly with three first engine mounts in a first single mounting plane and three second engine mounts in a second single mounting plane.
Figure 6B:
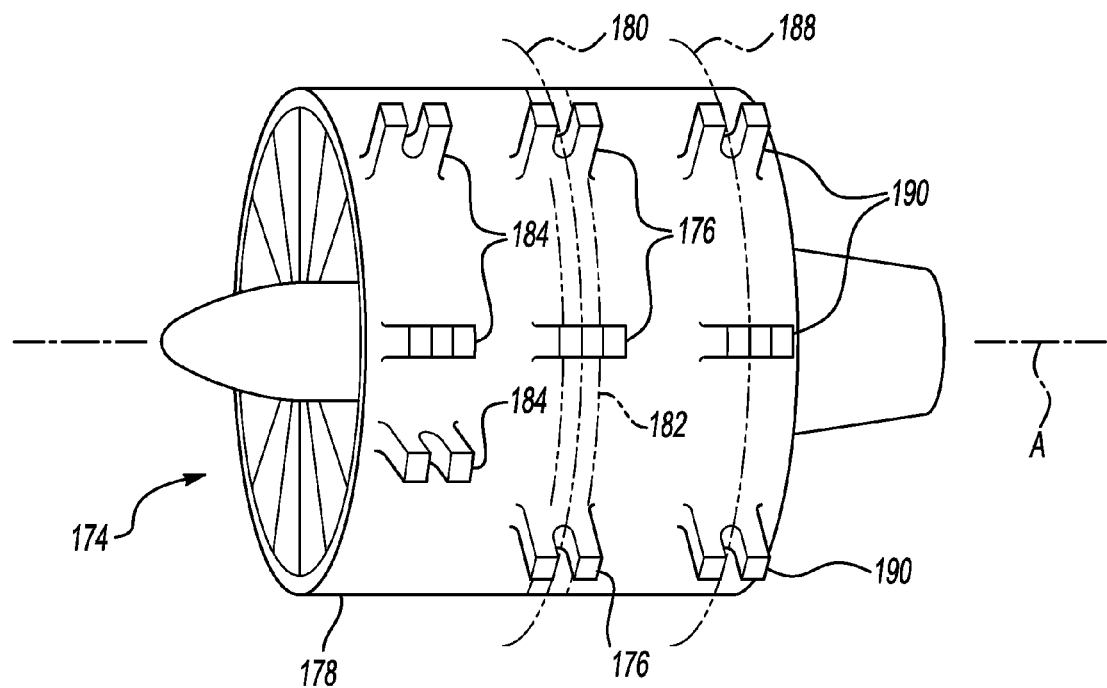
FIG. 6B is a perspective view of another embodiment of a tip turbine engine assembly with three first engine mounts in a first single mounting plane and three second engine mounts in a second single mounting plane with one of the first single mounting plane or second single mounting plane aft of the fan plane.

FIGS. 6A-6B shows a perspective view of another embodiment of the tip turbine engine assembly of the present invention. The engine 174 includes three first engine mounts 176 on the outer case 178 and positioned in a first mounting plane 180 which is substantially perpendicular to the engine centerline A. The first mounting plane 180 is coplanar with the fan plane 182 formed by the rotation of the fan-turbine rotor assembly 32 (FIG. 2). Three second engine mounts 184 are positioned in a second mounting plane 186 substantially parallel to the first mounting plane 180. The second mounting plane 186 is located forward of the fan plane 182, although the first engine mounts 176 or second engine mounts 184 may alternatively be positioned on the mounting plane 188 located aft of the fan plane 182, as illustrated by the engine mounts 190 drawn in FIG. 6B.

Figure 7:
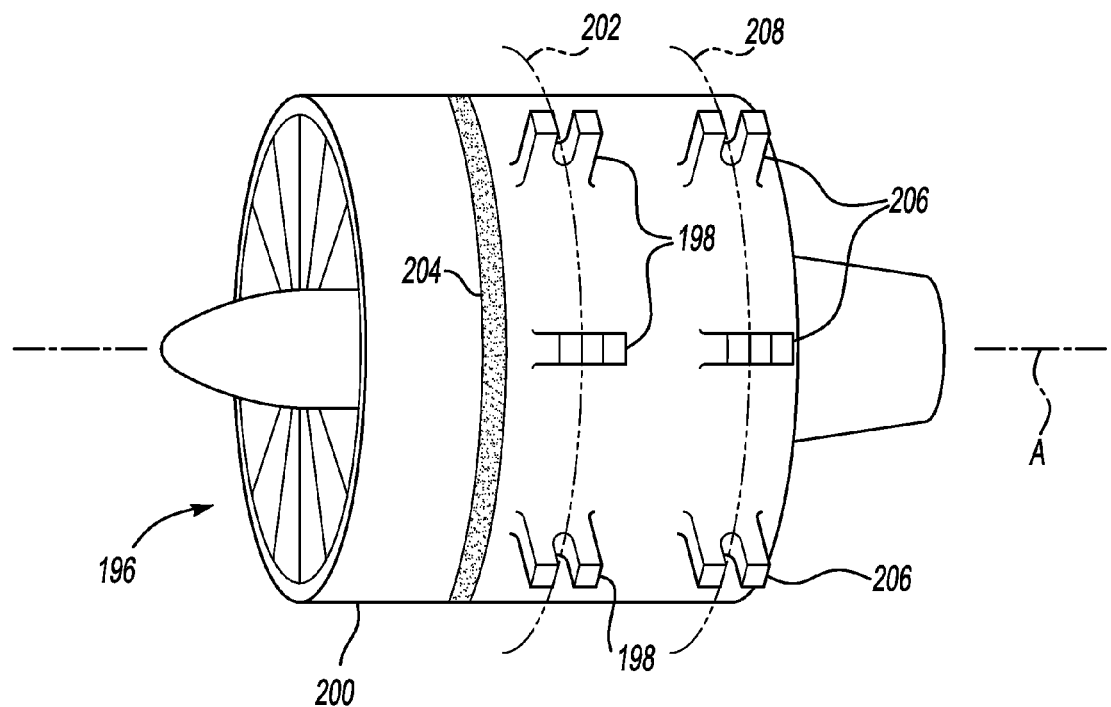
FIG. 7 is a perspective view of another embodiment of a tip turbine engine assembly with three first engine mounts in a first single mounting plane and three second engine mounts in a second single mounting plane.

FIG. 7 shows a perspective view of another tip turbine engine embodiment of the present invention. The engine 196 includes three first engine mounts 198 on an engine case 200 and positioned in a first mounting plane 202 which is substantially perpendicular to the engine centerline A. The first mounting plane 202 is located aft of the fan plane 204 defined by the rotation of the fan-turbine rotor assembly 32 (FIG. 2). Three second engine mounts 206 are positioned in a second mounting plane 208 also located aft of the fan plane 204 and parallel to the first mounting plane 202.

Figure 8:
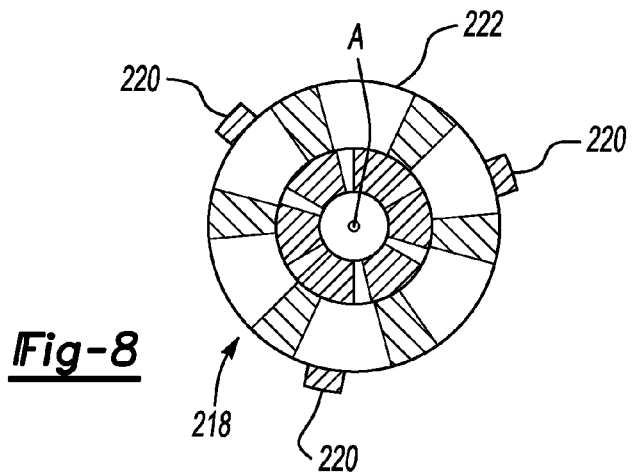
FIG. 8 is a longitudinal view of another embodiment of the tip turbine engine assembly having three engine mounts spaced 120° about an outer case.
Figure 5A:
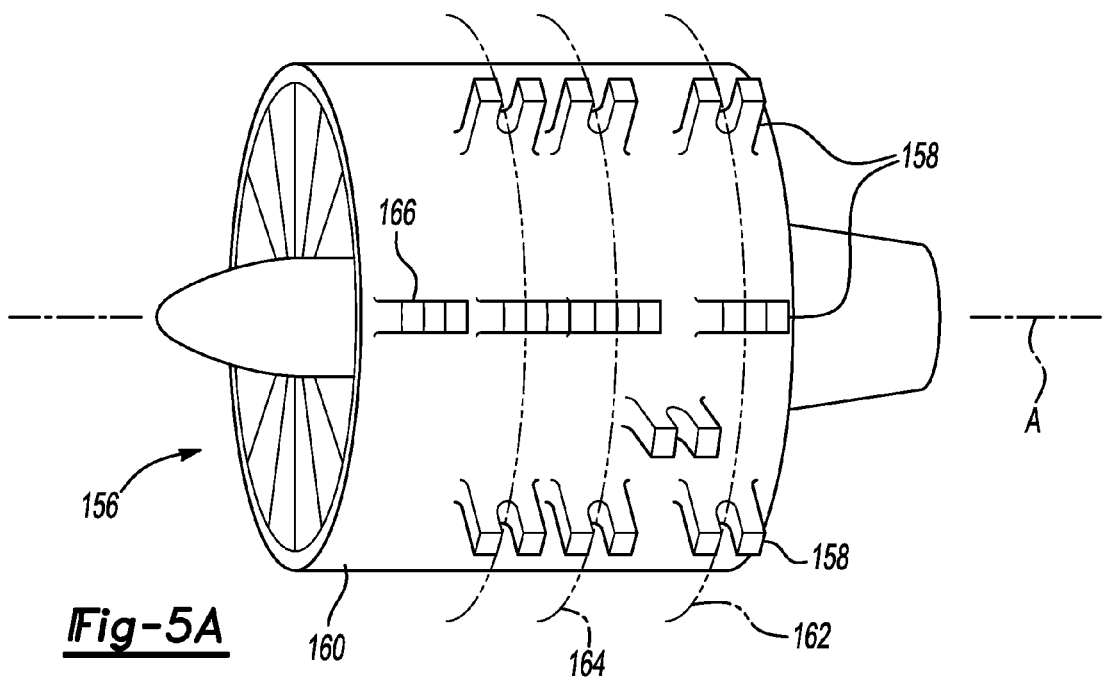
FIG. 5A is a perspective view of another embodiment of a tip turbine engine assembly with three first engine mounts in a single mounting plane and a second engine mount located remote from the single mounting plane.
Figure 5B:
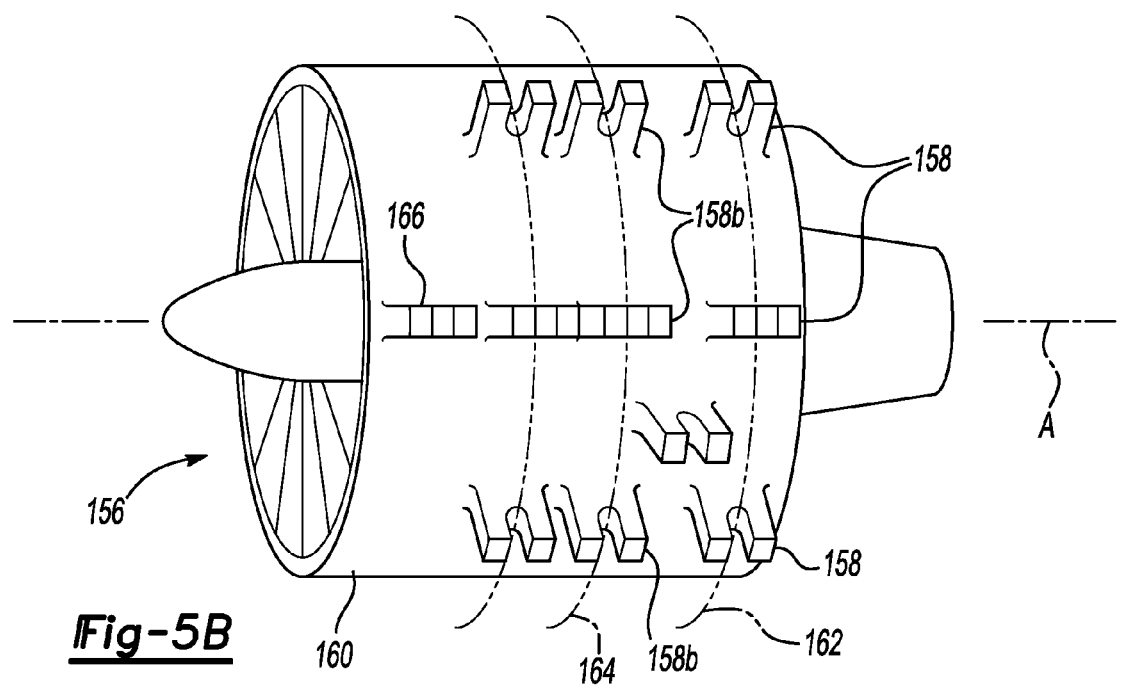
FIG. 5B is a perspective view of another embodiment of a tip turbine engine assembly with the first three engine mounts and the second engine mount coplanar with fan plane.
Figure 5C:
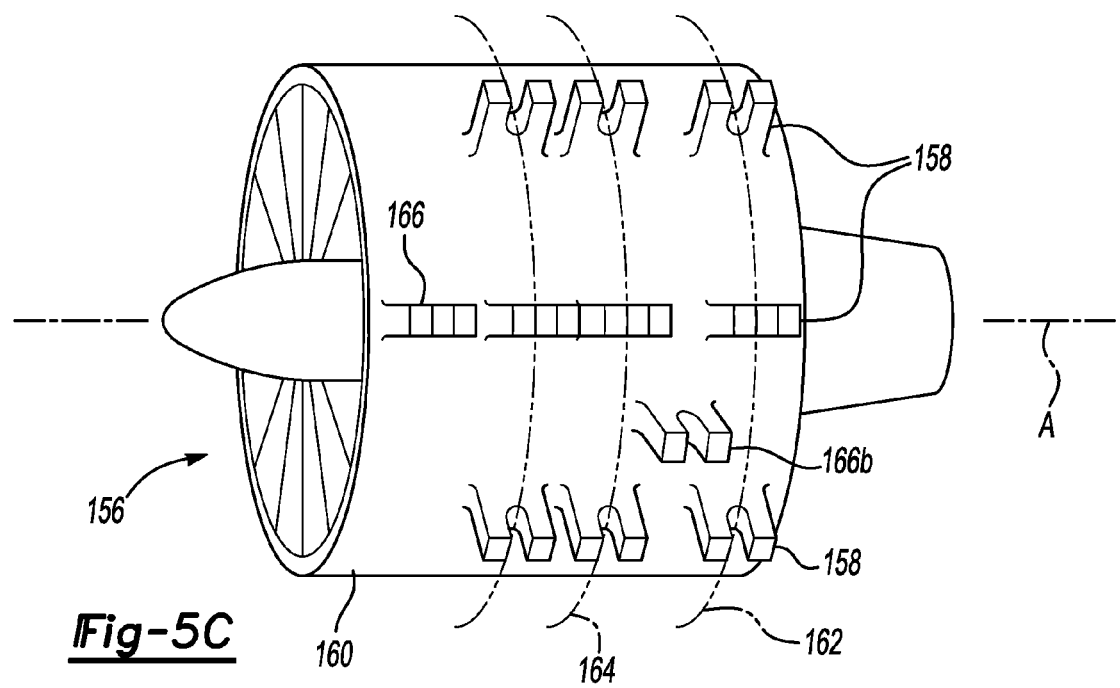
FIG. 5C is a perspective view of another embodiment of a tip turbine engine assembly with the first three engine mounts in a single mounting plane and a second engine mount aft of the fan plane.
Figure 5D:
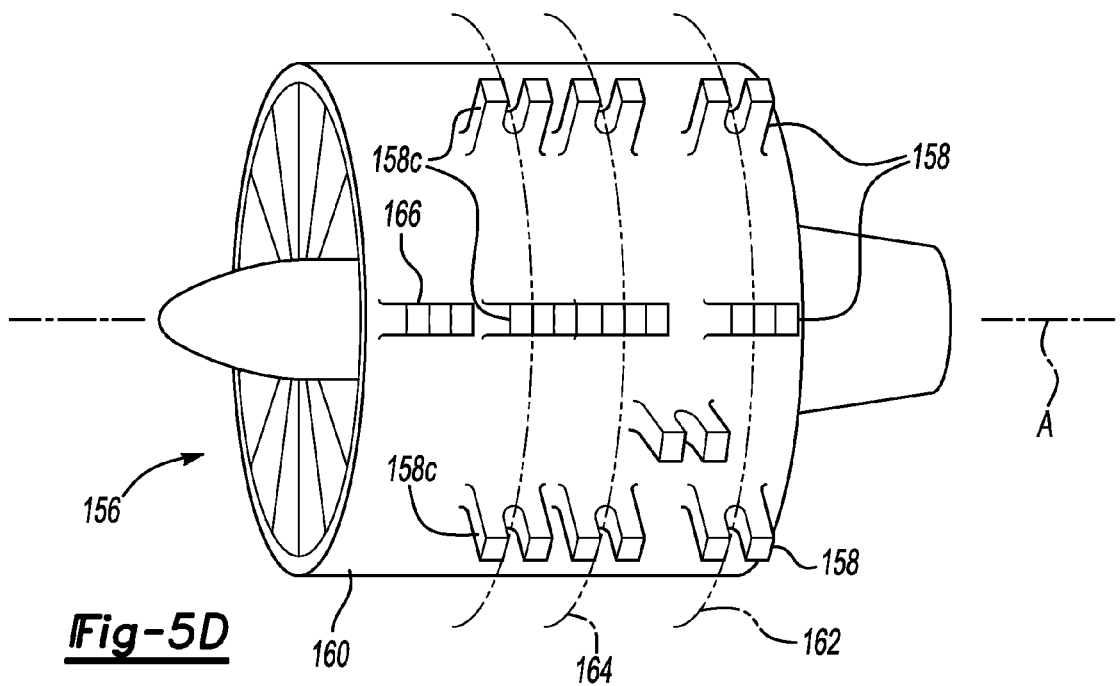
FIG. 5D is a perspective view of another embodiment of a tip turbine engine assembly with the first three engine mounts in a single mounting plane forward of the fan plane and a second engine mount located remote from the single mounting plane.

FIG. 8 illustrates a longitudinal view of another embodiment of the tip turbine engine assembly of the present invention. The engine 218 includes three engine mounts 220 on an outer case 222. The three engine mounts 220 are spaced circumferentially about the outer case 222 in a single mounting plane. In one example, the three engine mounts 220 are spaced approximately 120° apart relative to the engine centerline A. This may provide an advantage for evenly supporting the engine 218 when mounting the engine 218 vertically in an aircraft. In another example, the three engine mounts 220 are located in a single mounting plane that is aft of a fan plane, such as the single mounting plane 22 (FIG. 2).

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tip turbine engine assembly comprising:
a fan rotatable in a fan plane about an engine centerline, said fan including a fan blade defining a core airflow passage there through;
a turbine rotatable about said engine centerline aft of said fan;
an engine case disposed about said engine centerline; and
a plurality of engine mounts attached to said engine case substantially in a single mounting plane that is substantially perpendicular to said engine centerline, wherein said single mounting plane is located aft of said turbine, forward of said fan plane, or coplanar with said turbine and said fan plane.

2. The tip turbine engine assembly as recited in claim 1, wherein said plurality of engine mounts provides an exclusive support attachment on the engine case for attachment to an aircraft.

3. The tip turbine engine assembly as recited in claim 1, wherein said single mounting plane is axially aft of said turbine relative to the engine centerline.

4. The tip turbine engine assembly as recited in claim 1, wherein said single mounting plane is axially forward of said fan relative to the engine centerline.

5. The tip turbine engine assembly as recited in claim 1, wherein said single mounting plane is coplanar with said fan plane and said turbine.

6. The tip turbine engine assembly as recited in claim 1, wherein said plurality of engine mounts includes two engine mounts.

7. The tip turbine engine assembly as recited in claim 1, wherein a combustor is located radially outward of the fan blade and receives core airflow from the fan blade.

8. The tip turbine engine assembly as recited in claim 7, wherein the combustor is axially forward of the turbine.

9. The tip turbine engine as recited in claim 1, wherein the fan blade includes a diffuser section at an outer radial end relative to the engine centerline, wherein the diffuser turns the core airflow in an axial forward direction into a combustor.

10. The tip turbine engine assembly as recited in claim 1, wherein an axial compressor is axially forward of the fan blade and providing air to an inducer of the core airflow passage.

11. The tip turbine engine as recited in claim 1, wherein the core airflow passage turns airflow from an axial direction towards a combustor.

12. A tip turbine engine assembly comprising:
   a fan rotatable in a fan plane about an engine centerline, said fan including a fan blade defining a core airflow passage there through;
   a turbine rotatable about said engine centerline aft of said fan;
   an engine case disposed about said engine centerline;
   a plurality of first engine mounts attached to said engine case substantially in a first mounting plane that is substantially perpendicular to said engine centerline, wherein said first mounting plane is located aft of said turbine, forward of said fan plane, or coplanar with said turbine and said fan plane; and
   a plurality of second engine mounts attached to said engine case substantially in a second mounting plane.

13. The tip turbine engine assembly as recited in claim 12, wherein said first mounting plane is substantially parallel to said second mounting plane.

14. The tip turbine engine assembly as recited in claim 12, wherein said first mounting plane is axially aft of said turbine relative to the engine centerline.

15. The tip turbine engine assembly as recited in claim 12, wherein said first mounting plane is axially forward of said fan plane relative to the engine centerline.

16. The tip turbine engine assembly as recited in claim 12, wherein said first mounting plane is coplanar with said fan plane and said turbine.

17. The tip turbine engine assembly as recited in claim 12, wherein a combustor is located radially outward of the fan blade and receives core airflow from the fan blade.

18. A tip turbine engine assembly comprising:
   a fan rotatable in a fan plane about an engine centerline, said fan including a fan blade defining a core airflow passage there through;
   a turbine rotatable about said engine centerline aft of said fan;
   an engine case disposed about said engine centerline;
   a plurality of first engine mounts attached to said engine case substantially in a single mounting plane that is substantially perpendicular to said engine centerline, wherein said single mounting plane is located aft of said turbine, forward of said fan plane, or coplanar with said turbine and said fan plane; and
   a second engine mount attached to said engine case remote from said single mounting plane.

19. The tip turbine engine assembly as recited in claim 18, wherein all of said plurality of first engine mounts are substantially inside said single mounting plane.

20. The tip turbine engine assembly as recited in claim 18, wherein said single mounting plane is axially aft of said fan relative to the engine centerline.

21. The tip turbine engine assembly as recited in claim 18, wherein said single mounting plane and said second engine mount are axially aft of said fan relative to the engine centerline.

22. The tip turbine engine assembly as recited in claim 18, wherein said single mounting plane and said second engine mount are axially forward of said fan relative to the engine centerline.

23. The tip turbine engine assembly as recited in claim 18, wherein a combustor is located radially outward of the fan blade and receives core airflow from the fan blade.

* * * * *